(12) United States Patent
Nobusawa

(10) Patent No.: US 7,204,334 B2
(45) Date of Patent: Apr. 17, 2007

(54) OCCUPANT RESTRAINT SYSTEM

(75) Inventor: Hisashi Nobusawa, Fujisawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 466 days.

(21) Appl. No.: 10/774,541

(22) Filed: Feb. 10, 2004

(65) Prior Publication Data

US 2004/0163871 A1    Aug. 26, 2004

(30) Foreign Application Priority Data

Feb. 25, 2003    (JP)    ............ P2003-047581

(51) Int. Cl.
*B60R 21/00* (2006.01)
(52) U.S. Cl. .................................. 180/268
(58) Field of Classification Search ........... 180/268; 280/735, 801.1
See application file for complete search history.

(56) References Cited

U.S. PATENT DOCUMENTS

| 5,552,986 | A | 9/1996 | Omura et al. |
| 6,241,280 | B1 * | 6/2001 | Biewendt et al. ........ 280/735 |
| 6,327,528 | B1 | 12/2001 | Vallette et al. |
| 6,398,257 | B1 | 6/2002 | Ehama et al. |
| 6,874,819 | B2 * | 4/2005 | O'Neill ............... 280/805 |
| 2002/0027345 | A1 | 3/2002 | Aoki |
| 2003/0018421 | A1 | 1/2003 | Cooper |

FOREIGN PATENT DOCUMENTS

| DE | 39 32 417 A1 | 4/1991 |
| JP | 06-286581 | 10/1994 |
| JP | 6-288581 | 10/1994 |
| JP | 2000-326819 | 11/2000 |
| JP | 2002-29365 | 1/2002 |
| JP | 2002-178873 | 6/2002 |
| WO | WO 01/83267 A1 | 11/2001 |

OTHER PUBLICATIONS

Japanese Office Action issued in corresponding Japanese Patent Application No. JP 2003-047581, dated Dec. 5, 2006.

* cited by examiner

*Primary Examiner*—Faye M. Fleming
(74) *Attorney, Agent, or Firm*—McDermott Will & Emery LLP

(57) ABSTRACT

An occupant restraint system of the present invention comprises a first sensor unit which detects a state of wearing a seatbelt system, a second sensor unit which detects a state of operating the seatbelt system, and a controller which performs a control to change a time range to determine activation and expansion of a occupant restraint equipment upon a vehicle collision in accordance with signals from the first sensor unit and the second sensor unit. In the occupant restraint system, when a state detected by the first sensor unit is a state of not wearing the seatbelt system, the controller performs a control to set a mode to a stopping mode which has a time range to determine the activation and expansion of the occupant restraint equipment upon a vehicle collision, and when a state detected by the first sensor unit is a state of wearing the seatbelt system and a state detected by the second sensor unit is a state of operating the seatbelt system, the controller performs a control to set the mode to an operating mode which has a smaller time range to determine the activation and expansion of the occupant restraint equipment upon a vehicle collision than that in the state of not wearing the seatbelt system.

6 Claims, 6 Drawing Sheets

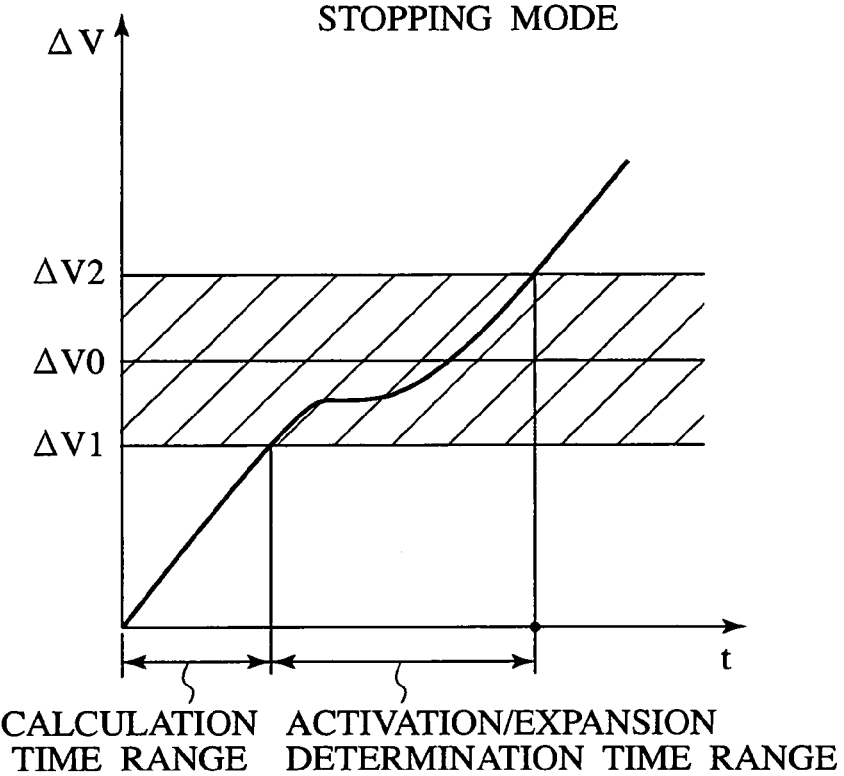
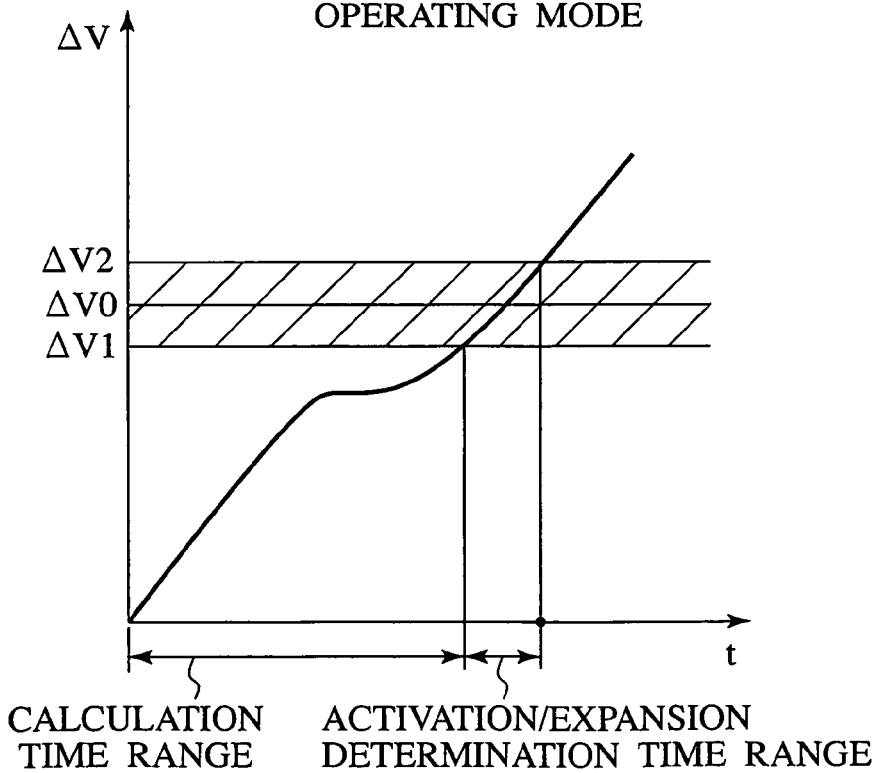

OCCUPANT RESTRAINT SYSTEM

BACKGROUND OF THE INVENTION

1. Field of the Invention

The present invention relates to an occupant restraint system responsive to states of wearing and operating a seatbelt.

2. Description of the Related Art

In a vehicle on which a vehicle's seatbelt system is mounted, there are conventional technologies in which an airbag and a pretensioner are each controlled, and in which an airbag and a pretensioner are both controlled, in a state of wearing a seatbelt (refer to Japanese Patent Application Laid-Open No. H6-286581).

SUMMARY OF THE INVENTION

However, in the above-mentioned technologies, when controlling an airbag and a pretensioner, the control is performed on condition that an occupant is wearing a seatbelt system. The control of the airbag and the pretensioner is not performed on condition that the seatbelt system is operating, that is, on condition that an occupant is correctly wearing a seatbelt and further is fastened tightly by the seatbelt.

The present invention was made in consideration of the above-described problems. It is an object of the present invention to provide an occupant restraint system which can perform proper occupant restraint control in accordance with states of wearing and operating a vehicle's seatbelt system.

The first aspect of the present invention provides an occupant restraint system, comprising: a first sensor unit which detects a state of wearing a seatbelt system; a second sensor unit which detects a state of operating the seatbelt system; and a controller which performs a control to change a time range to determine activation and expansion of a occupant restraint equipment upon a vehicle collision in accordance with signals from the first sensor unit and the second sensor unit, wherein when a state detected by the first sensor unit is a state of not wearing the seatbelt system, the controller performs a control to set a mode to a stopping mode which has a time range to determine the activation and expansion of the occupant restraint equipment upon a vehicle collision, and when a state detected by the first sensor unit is a state of wearing the seatbelt system and a state detected by the second sensor unit is a state of operating the seatbelt system, the controller performs a control to set the mode to an operating mode which has a smaller time range to determine the activation and expansion of the occupant restraint equipment upon the vehicle collision than that in the state of not wearing the seatbelt system.

The second aspect of the present invention provides an occupant restraint system, comprising: first sensor means for detecting a state of wearing a seatbelt system; second sensor means for detecting a state of operating the seatbelt system; and control means for performing a control to change a time range to determine activation and expansion of a occupant restraint equipment upon a vehicle collision in accordance with signals from the first sensor means and the second sensor means, wherein when a state detected by the first sensor means is a state of not wearing the seatbelt system, the control means performs a control to set a mode to a stopping mode which has a time range to determine the activation and expansion of the occupant restraint equipment upon a vehicle collision, and when a state detected by the first sensor means is a state of wearing the seatbelt system and a state detected by the second sensor means is a state of operating the seatbelt system, the control means performs a control to set the mode to an operating mode which has a smaller time range to determine the activation and expansion of the occupant restraint equipment upon the vehicle collision than that in the state of not wearing the seatbelt system.

The third aspect of the present invention provides a method for restraining an occupant, comprising: detecting a state of wearing a seatbelt system; detecting a state of operating the seat belt system; performing a control to set a mode to a stopping mode which has a time range to determine the activation and expansion of an occupant restraint equipment upon a vehicle collision when the seatbelt system is in a state of not being worn, and to set the mode to an operating mode which has a smaller time range to determine the activation and expansion of the occupant restraint equipment upon the vehicle collision than that in the state of not wearing the seatbelt system when the seatbelt system is in a state of being worn and operated.

BRIEF DESCRIPTION OF THE DRAWINGS

The invention will now be described with reference to the accompanying drawings wherein;

FIG. 5 is a graph showing a relationship between velocity changes and time changes when the control by an occupant restraint device is in a stopping mode, according to the occupant restraint system of the present invention;

FIG. 6 is a graph showing a relationship between velocity changes and time changes when the control by the occupant restraint device is in an operating mode, according to the occupant restraint system of the present invention;

DETAILED DESCRIPTION OF THE PREFERRED EMBODIMENT

Hereinafter, description will be made of embodiments of the present invention with reference to the drawings.

Figure 1:
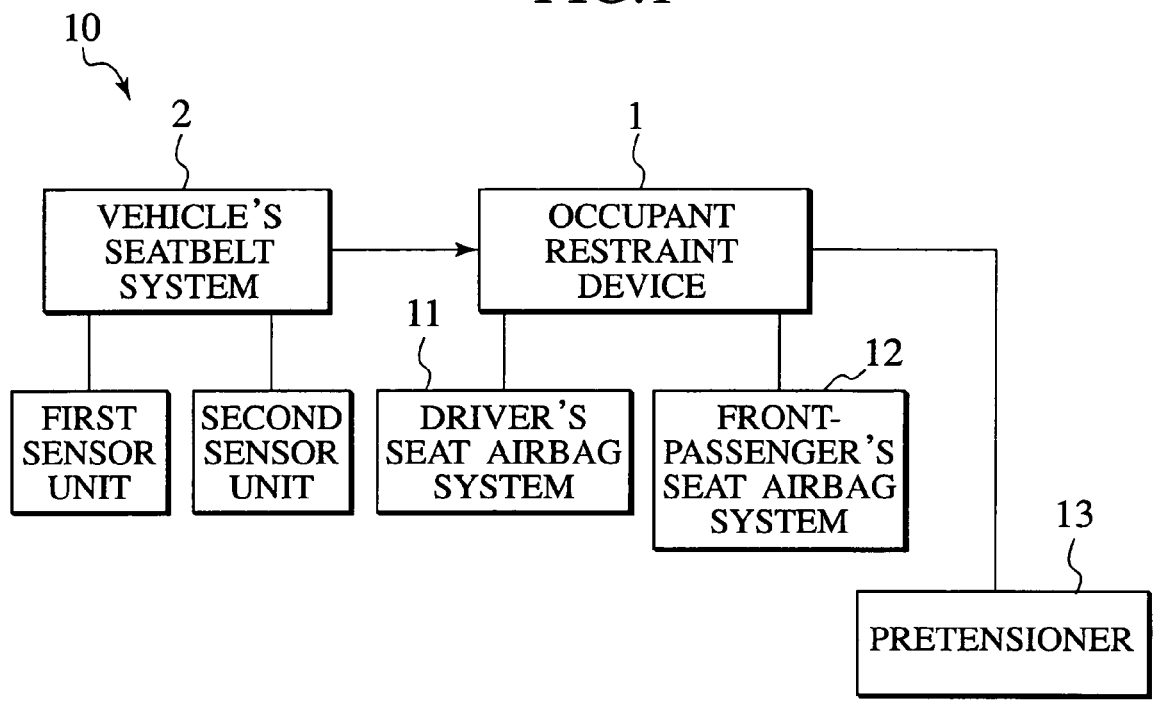
FIG. 1 is a block diagram showing a configuration of an occupant restraint system of the present invention.

An occupant restraint system 10 of the present invention is configured as shown in FIG. 1.

The occupant restraint system 10 of the present invention is mounted on a vehicle and includes an occupant restraint device 1 and a vehicle's seatbelt system 2. The occupant restraint device 1 (corresponding to a controller) performs a control of timing to activate and expand equipment for restraining an occupant, or occupants, in a vehicle.

The occupant restraint device 1 is connected to a driver's seat airbag system 11 for an occupant seated in a driver's seat, to a front-passenger's seat airbag system 12 for an occupant seated in a front-passenger's seat, and to a pretensioner 13. Upon receiving information to the effect that the occurrence of a collision has been detected by an external collision sensor, the occupant restraint device 1 expands the driver's seat airbag system 11 and the front-passenger's seat airbag system 12, and activates the pretensioner 13, thereby performing a control to restrain the occupants seated in the driver's seat and in the front-passenger's seat. Note that the driver's seat airbag system 11, the front-passenger's seat airbag system 12 and the pretensioner 13 are collectively referred to also as occupant restraint equipment in this specification.

As for the configuration of the driver's seat airbag system 11 and the front-passenger's seat airbag system 12, upon a vehicle collision, a gas generator of an ignition type instantaneously inflates an air cushion (airbag), thereby protecting the head and chest of an occupant from interior equipment including a steering wheel, an instrument panel, doors, B pillars, and the like.

Figure 2:
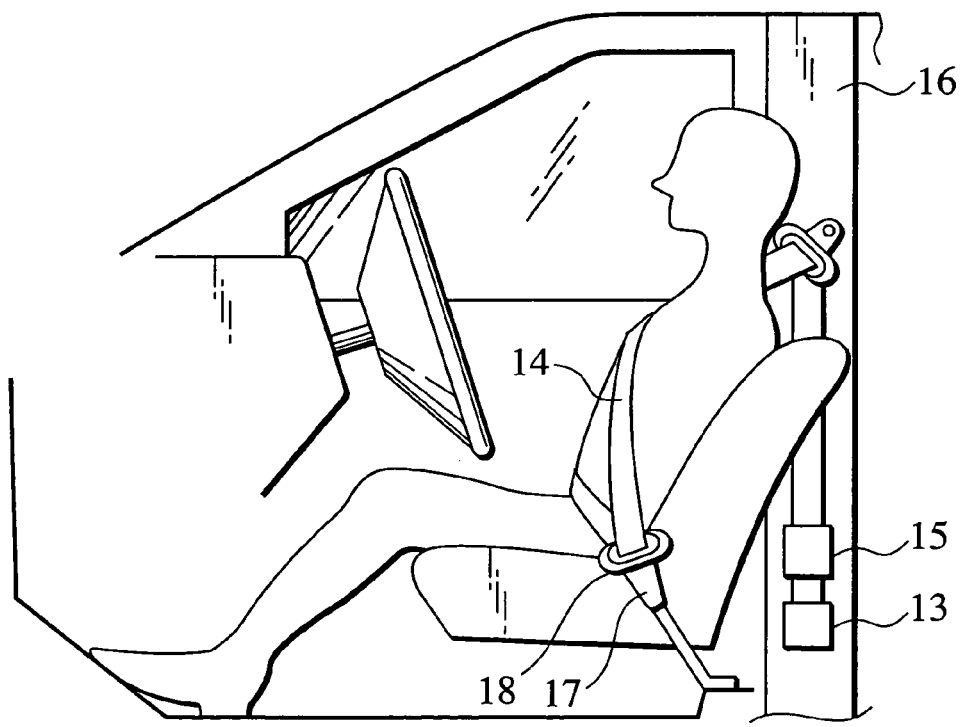
FIG. 2 is a schematic view showing a vehicle's seatbelt system.

As shown in FIG. 2, in order to prevent an excessive forward movement of an occupant in the event of a vehicle collision, the pretensioner 13 (seatbelt tensioner 13) immediately winds up a seatbelt 14, and exerts a tensile force on the occupant, and thus the occupant is restrained. The pretensioner 13 is configured to instantaneously wind up the seatbelt 14 with an explosive force using an explosive or a spring upon a vehicle collision.

Figure 3:
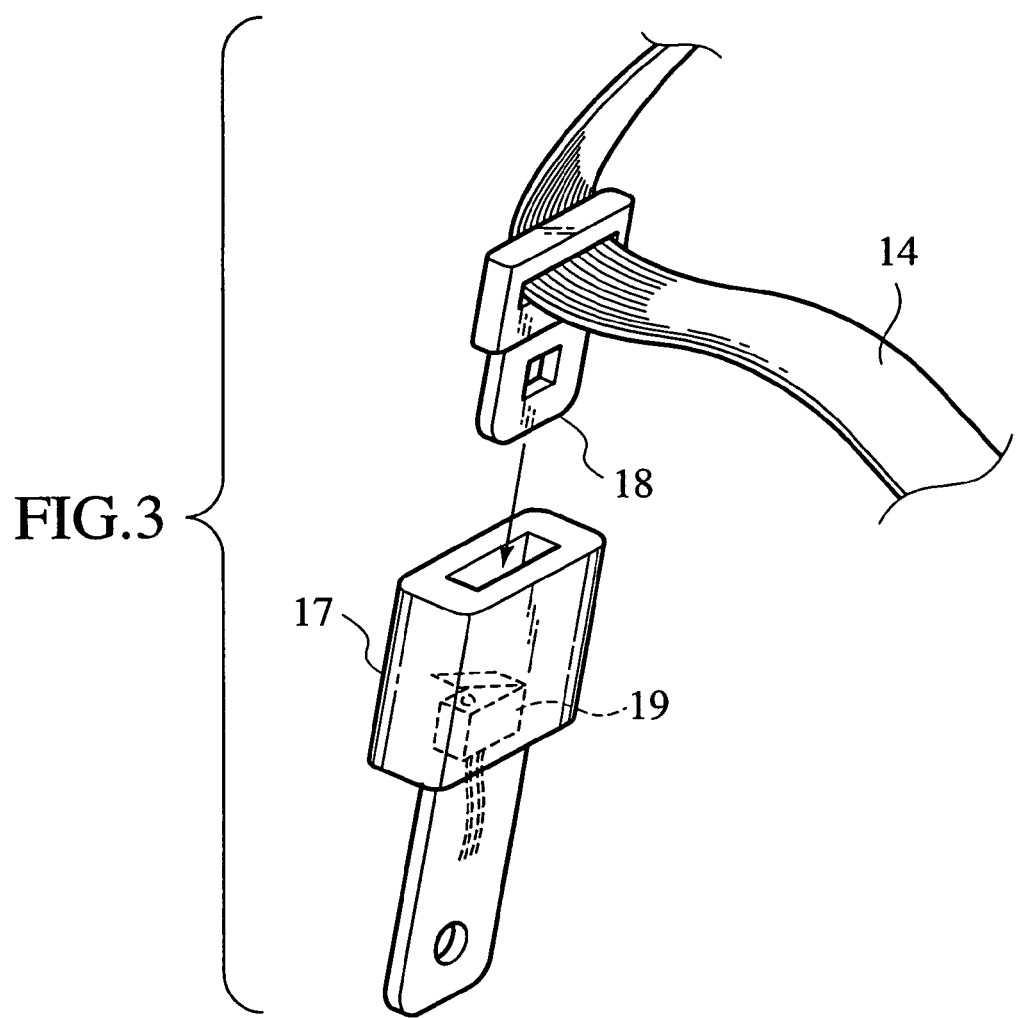
FIG. 3 is a perspective view of a tongue and a buckle of a seatbelt incorporating a first sensor unit.

As shown in FIGS. 2 and 3, the seatbelt 14 is worn in such a manner that the seatbelt 14 is drawn out from a retractor (not shown) which is fixed to a lower portion of a pillar 16 on a body side, or the like; a tongue 18 is mechanically inserted into a buckle 17 on the body side and fixed thereto.

The vehicle's seatbelt system 2 in the occupant restraint system 10 of the present invention includes the seatbelt 14. Further, the vehicle's seatbelt system 2 is connected to a unit (corresponding to a first sensor unit) for detecting a state of wearing the seatbelt 14 which is worn by an occupant seated in the driver's seat or in the front-passenger's seat. Specifically, the vehicle's seatbelt system 2 is connected to a switch 19 serving as the first sensor unit for detecting whether or not the tongue 18 of the seatbelt 14 is connected to the buckle 17. When the tongue 18 is inserted into the buckle 17 and fixed thereto, a connection signal is sent from the switch 19, as the first sensor unit, to the vehicle's seatbelt system 2.

In addition, the occupant restraint system 10 of the present invention is applied to a vehicle including a pre-crash seatbelt system. Specifically, as shown in FIG. 2, at the lower portion of the pillar 16, the pretensioner 13 and a motor 15 that is included in the pre-crash seatbelt system are provided. Further, the seatbelt 14 is connected to both the pretensioner 13 and the motor 15. The pre-crash seatbelt system is a system of winding up the seatbelt 14 with the motor 15 to restrain an occupant before a vehicle collision, that is, when a collision avoidance maneuver is possible. As a mechanism for anticipating a collision, a mechanism is employed, which includes a radar in front of a vehicle, measures a distance between the vehicle and an obstacle in front, and anticipates a collision. Moreover, a mechanism is also employed, which detects driver's braking operation before a collision, that is, emergency braking operation performed by the driver before a collision. However, the mechanism for anticipating a collision is not limited to these mechanisms. Any mechanism can be employed as long as it anticipates a collision. Regarding the concrete workings of the pre-crash seatbelt system, a signal is sent from a collision anticipating mechanism to an ECU when a vehicle is likely to collide against an obstacle in front. The ECU then outputs an activating signal to the motor 15, and the motor 15 winds up the seatbelt 14, thus restraining an occupant. A tensile force on the seatbelt at this time is less than that exerted when the seatbelt 14 is wound up by the pretensioner 13. Accordingly, the occupant is restrained to such an extent that the occupant can still handle a steering wheel and avoid a collision.

Moreover, the vehicle's seatbelt system 2 is connected to a unit (corresponding to a second sensor unit) for detecting that the motor 15 is operating.

The occupant restraint system 10 of the present invention, including the above-described occupant restraint device 1 and vehicle's seatbelt system 2, is characterized by optimally activating and expanding the occupant restraint equipment by changing a time period to judge the activation and expansion of the occupant restraint equipment in accordance with states of wearing and operating the seatbelt 14. This will be described in detail below.

Figure 4:
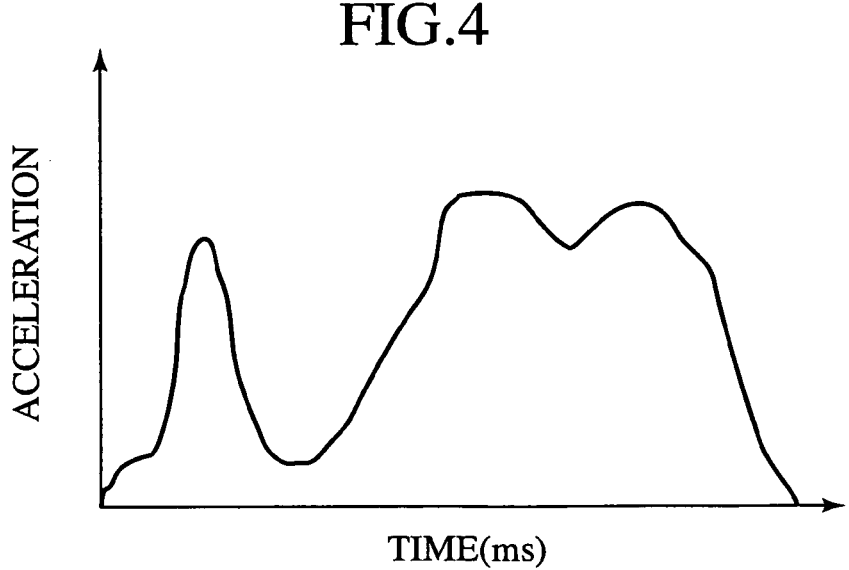
FIG. 4 is a graph showing a time history of acceleration G of a vehicle upon a collision.

First, a description will be given of states of a vehicle and of an occupant in the event of a collision of the vehicle against an obstacle in front. When the vehicle collides against the obstacle in front, acceleration G as shown in FIG. 4 is generated in the vehicle. This acceleration G can be detected by an acceleration sensor or the like. At this event, if an occupant is not wearing the seatbelt, the body of the occupant is moved toward the front of the vehicle due to the collision, and therefore there is a strong possibility that the occupant strikes his/her head and chest on a steering wheel and/or a windshield. However, if an occupant is wearing the seatbelt, the occupant is restrained to some extent by the pre-crash seatbelt system before a collision. Upon the collision, the pretensioner 13 is activated and instantaneously winds up the seatbelt 14, thereby firmly restraining the occupant. Accordingly, there is less possibility that the occupant strikes his/her head and chest on the steering wheel and/or the windshield.

Here, in the case of the occupant not wearing the seatbelt, since the occupant is considerably moved toward the front of the vehicle upon the collision, it is necessary to start expansion time of the airbag system as soon as possible after the collision. However, in the case of the occupant wearing the seatbelt, the occupant is restrained by the seatbelt before the collision. Accordingly, even if the expansion time of the airbag system is delayed in comparison with the case of the occupant not wearing the seatbelt, the occupant can be properly protected by the airbag system and can be prevented from colliding against the interior equipment.

In other words, the occupant restraint system 10 of the present invention is characterized by securing a calculation time to determine whether or not to activate and expand the occupant restraint equipment, and activating and expanding the occupant restraint equipment at more proper timing, in such a manner that the occupant restraint device 1 as a controller changes a time period to determine the activation and expansion of the occupant restraint equipment in accordance with states of wearing and operating the seatbelt. Here, in this specification, the state of wearing the seatbelt is a state where the tongue 18 of the seatbelt 14 is inserted into the buckle 17 and fixed thereto, that is, a state where an occupant wears the seatbelt 14. Moreover, the state of operating the seatbelt is a state where a signal is sent from the collision anticipating mechanism to the ECU and the motor 15 winds up the seatbelt 14. Now a description will be given of the concrete workings of the occupant restraint system of the present invention.

When a vehicle collides against an obstacle in front, the acceleration G as shown in FIG. 4 is generated in the vehicle body. Integrating this acceleration G results in the relationships between velocity ΔV and time t as shown in FIGS. 5 and 6.

Herein, in the state of not wearing the seatbelt 14, it is necessary to quickly activate and expand the occupant restraint equipment connected to the occupant restraint device 1. Therefore, a threshold ΔV0 for the determination of activation and expansion is reduced, thus advancing the activation and expansion. Here, the threshold is a target value to activate and expand the occupant restraint equipment when the velocity ΔV reaches the threshold ΔV0. The activation and expansion of the occupant restraint equipment is possible in a range from a velocity ΔV1 to a velocity ΔV2 with the threshold ΔV0 in the middle of the range. In other words, with the target of the threshold ΔV0, the occupant restraint device 1 starts activating and expanding the occupant restraint equipment while the velocity is in the range from ΔV1 to ΔV2.

As shown in FIG. 5, in the state of not wearing the seatbelt (hereinafter, also referred to as a stopping mode), since it is necessary to quickly activate and expand the occupant restraint equipment, the threshold ΔV0 is set low. Thus, the activation/expansion determination time period is increased, and therefore a calculation time period is reduced.

However, in the state of wearing, and further operating the seatbelt (hereinafter, also referred to as an operating mode), since an occupant is restrained by the seatbelt, it is possible to delay the activation and expansion of the occupant restraint equipment connected to the occupant restraint device 1. That is, it is possible to raise the threshold ΔV0 to reduce the activation/expansion determination time range and increase the calculation time range. An increase in the calculation time enables the occupant restraint device 1 to properly set the activation/expansion determination time and to start activating and expanding the occupant restraint equipment at more proper timing.

Figure 7:
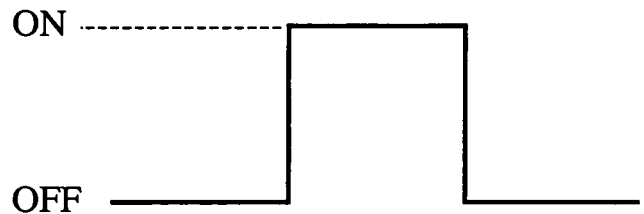
FIG. 7 is a view for explaining an operating signal to be sent from the vehicle's seatbelt system to the occupant restraint device, according to the occupant restraint system of the present invention.

Control of modes between the stopping mode and the operating mode is performed based on signals sent from the first sensor unit and from the second sensor unit to the vehicle's seatbelt system 2. Specifically, when the seatbelt is worn, an ON signal shown in FIG. 7 is sent from the first sensor unit to the vehicle's seatbelt system 2. Further, when the vehicle is likely to collide against an obstacle in front, a signal is sent from the collision anticipating mechanism to the motor 15, and the motor 15 then winds up the seatbelt 14. When the second sensor unit detects this operation of the motor 15, a similar ON signal is sent to the vehicle's seatbelt system 2. When the vehicle's seatbelt system 2 receives the signals both from the first and second sensor units, an ON signal is sent from the vehicle's seatbelt system 2 to the occupant restraint device 1. The occupant restraint device 1 then performs a control to change the mode from the stopping mode to the operating mode, to raise the threshold ΔV0, and to reduce the activation/expansion determination time range.

Figure 8:
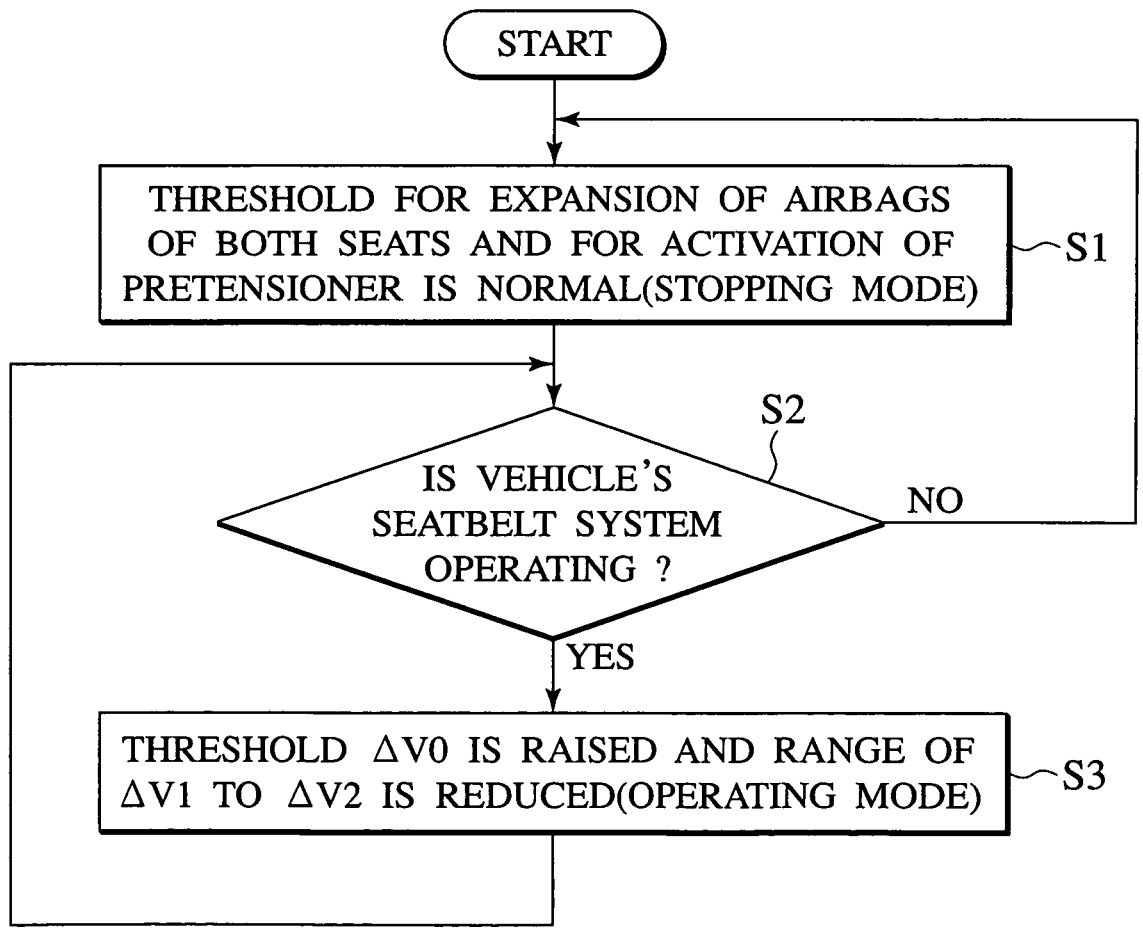
FIG. 8 is a flowchart for explaining workings of the occupant restraint device, according to the occupant restraint system of the present invention.

Next, a description will be given of the control of modes between the stopping mode and the operating mode with reference to a flowchart of FIG. 8.

In this occupant restraint system, while the occupant restraint device 1 and the vehicle's seatbelt system 2 are operating after being activated, for example, by activating an ignition switch, processing from a step S1 is started for every predetermined time period.

Specifically, in the step S1, the occupant restraint device 1 sets the threshold ΔV0 for the event of the activation and expansion of the occupant restraint equipment to a value in the stopping mode. The processing then proceeds to a step S2.

In the step S2, by judging, in the occupant restraint device 1, whether an operation signal from the vehicle's seatbelt system 2 is ON or not, it is judged whether or not an occupant is wearing the seatbelt 14 and whether or not the motor 15 is operating. When it is judged that the occupant is not wearing the seatbelt and that the motor 15 is not operating, the mode is controlled to be kept in the stopping mode, and the processing returns to the step S1. When it is judged that the seatbelt 14 and the motor 15 are both operating, the processing proceeds to a step S3.

In the step S3, the occupant restraint device 1 performs a control to change the mode from the stopping mode to the operating mode, thereby raising the threshold ΔV0 and reducing the range of ΔV1 to ΔV2. The processing then returns to the step S2.

In this way, in the occupant restraint system 10, when the seatbelt 14 is operating, the control is performed to shift the mode from the stopping mode to the operating mode, thus increasing the calculation time until the determination of activation and expansion.

As described above, according to the occupant restraint system of this embodiment, the sensor units for detecting states of wearing and operating the seatbelt 14 are connected to the vehicle's seatbelt system 2. When the seatbelt 14 is operating, a signal is sent from the vehicle's seatbelt system 2 to the occupant restraint device 1 to change the mode from the stopping mode to the operating mode. Thus, the calculation time range until the determination to expand the driver's seat airbag system 11 and the front-passenger's seat airbag system 12 and to activate the pretensioner 13 upon a collision, is increased, and the activation/expansion determination time range upon the collision is reduced. In this way, the expansion of the driver's seat airbag system 11 and the front-passenger airbag system 12 and the activation of the pretensioner 13 can be conducted at a proper timing, and therefore it is possible to securely prevent the occupant from colliding against the interior equipment.

Moreover, the occupant restraint system of the present invention is applied to a vehicle equipped with a pre-crash seatbelt system. Therefore, since an occupant is restrained to some extent by the motor 15 operating before a vehicle collision, the amount of movement of the occupant toward the front of the vehicle can be kept to a minimum. Subsequently, the occupant restraint system of the present invention allows the occupant restraint equipment to start operating at an optimal timing. Accordingly, it is possible to securely prevent the occupant from colliding against the interior equipment.

It should be noted that, in the above-described occupant restraint system, although the description has been given of the configuration in which the pretensioner 13 is connected to the seatbelt 14, the configuration is not limited to this. A configuration with double pretensioners in which another pretensioner than the pretensioner 13 is also activated in the event of a collision, may be employed.

Figure 9:
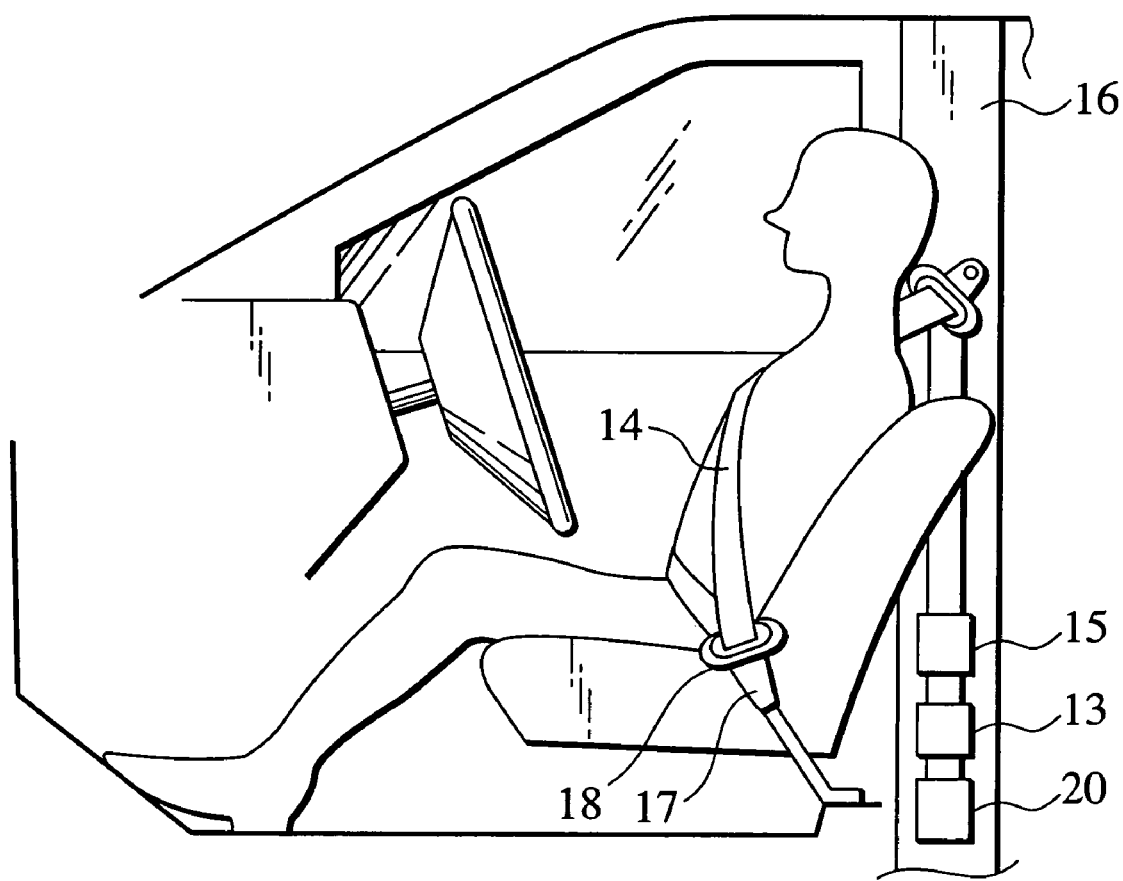
FIG. 9 is a schematic view showing a vehicle's seatbelt system including double pretensioners.

Specifically, as shown in FIG. 9, another pretensioner 20 (second pretensioner 20) may be provided at a lower portion than the pretensioner 13 (first pretensioner 13) in the pillar 16 to form double pretensioners. With such a configuration, by first activating the pretensioner 13, and then activating the pretensioner 20, it is possible to more securely restrain an occupant.

Figure 10:
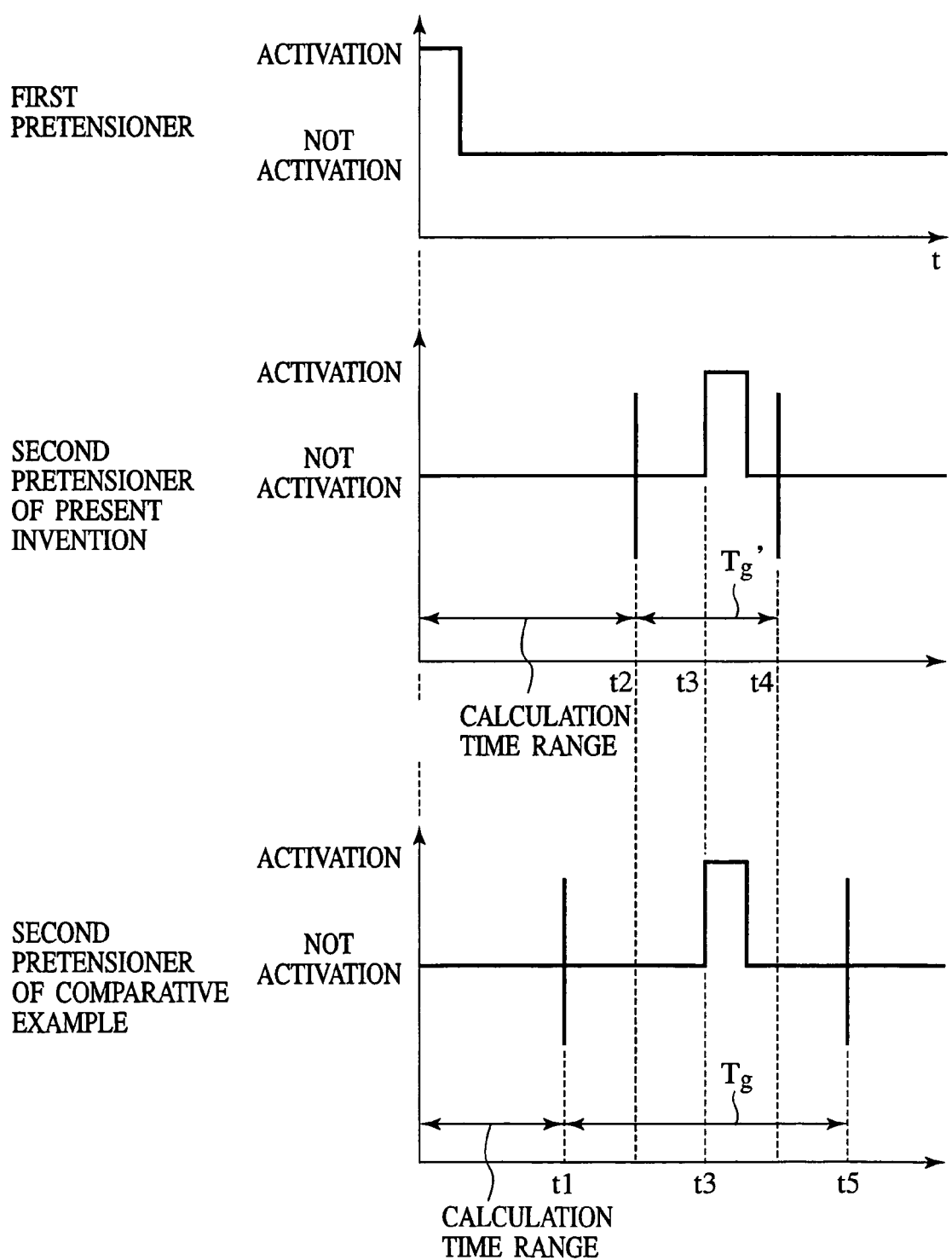
FIG. 10 is timing charts for explaining workings of the occupant restraint system when the double pretensioners are mounted thereon.

A description will be given of the workings of the double pretensioners with reference to FIG. 10. In the case where the occupant restraint system 10 of the present invention is used, the occupant restraint device 1 receives an operation signal from the vehicle's seatbelt system 2 and performs a control to change the mode from the stopping mode to the operating mode before a collision. Thereafter, when the vehicle collides against an obstacle in front, the first pretensioner 13 is activated first, and then the second pretensioner is activated. In the occupant restraint system 10 of the present invention, a time period after the activation of the first pretensioner 13 before time t2 is allocated as calculation time until the determination of the activation of the second pretensioner 20, and the second pretensioner 20 is activated at time t3. In this case, a time period from the time t2 to time t4 is an activation/expansion determination time range Tg'. On the other hand, in the case (comparative example) where the occupant restraint system of the present invention is not used, a time period from time t1 to time t5 is an activation/expansion determination time range Tg. Accordingly, by using the occupant restraint system 10 of the present invention, it is possible to shorten the activation/expansion determination time period to prolong the calculation time period even in the case of double pretensioners. Therefore, it is possible to activate the second pretensioner 20 at optimal timing.

Note that the above-described embodiment is one example of the present invention. Therefore, the present invention is not limited to the above embodiment, and, needless to say, various changes other than the above embodiment may be made in accordance with design and the like without departing from the technical idea of the present invention.

Specifically, regarding the occupant restraint equipment, although the driver's seat airbag system, the front-passenger's seat airbag system, and the pretensioner are shown in this specification, other equipment which restrains the movement of an occupant in the event of a vehicle collision may be used.

Moreover, regarding the pre-crash seatbelt system, although the motor 15 is used when the seatbelt is wound up, a device or a system is not limited to a motor, and various types of winding device or system may be used.

Furthermore, regarding the double pretensioners, although the second pretensioner is arranged in the vicinity of the first pretensioner, the second pretensioner may be arranged in the vicinity of the buckle 17.

The entire content of a Japanese Patent Application No. P2003-047581 with a filing date of Feb. 25, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An occupant restraint system, comprising:
a first sensor unit which detects a state of wearing a seatbelt system;
a second sensor unit which detects a state of operating the seatbelt system; and
a controller which performs a control to change a time range to determine activation and expansion of a occupant restraint equipment upon a vehicle collision in accordance with signals from the first sensor unit and the second sensor unit,
wherein when a state detected by the first sensor unit is a state of not wearing the seatbelt system, the controller performs a control to set a mode to a stopping mode which has a time range to determine the activation and expansion of the occupant restraint equipment upon a vehicle collision, and
when a state detected by the first sensor unit is a state of wearing the seatbelt system and a state detected by the second sensor unit is a state of operating the seatbelt system, the controller performs a control to set the mode to an operating mode which has a smaller time range to determine the activation and expansion of the occupant restraint equipment upon the vehicle collision than that in the state of not wearing the seatbelt system.

2. An occupant restraint system according to claim 1, wherein the controller performs a control to delay the activation and expansion of the occupant restraint equipment, in the operating mode.

3. An occupant restraint system according to claim 1, wherein the occupant restraint equipment is at least one of an airbag system and a pretensioner.

4. An occupant restraint system according to claim 1, wherein the occupant restraint equipment is at least one of an airbag system and a set of double pretensioners.

5. An occupant restraint system, comprising:
first sensor means for detecting a state of wearing a seatbelt system;
second sensor means for detecting a state of operating the seatbelt system; and
control means for performing a control to change a time range to determine activation and expansion of a occupant restraint equipment upon a vehicle collision in accordance with signals from the first sensor means and the second sensor means,
wherein when a state detected by the first sensor means is a state of not wearing the seatbelt system, the control means performs a control to set a mode to a stopping mode which has a time range to determine the activation and expansion of the occupant restraint equipment upon a vehicle collision, and
when a state detected by the first sensor means is a state of wearing the seatbelt system and a state detected by the second sensor means is a state of operating the seatbelt system, the control means performs a control to set the mode to an operating mode which has a smaller time range to determine the activation and expansion of the occupant restraint equipment upon the vehicle collision than that in the state of not wearing the seatbelt system.

6. A method for restraining an occupant, comprising:
detecting a state of wearing a seatbelt system;
detecting a state of operating the seat belt system;
performing a control to set a mode to a stopping mode which has a time range to determine the activation and expansion of an occupant restraint equipment upon a vehicle collision when the seatbelt system is in a state of not being worn, and to set the mode to an operating mode which has a smaller time range to determine the activation and expansion of the occupant restraint equipment upon the vehicle collision than that in the state of not wearing the seatbelt system when the seatbelt system is in a state of being worn and operated.

* * * * *